T. W. WILLERTON.
TIRE.
APPLICATION FILED OCT. 7, 1918.

1,319,549. Patented Oct. 21, 1919.

Inventor
Thomas William Willerton

UNITED STATES PATENT OFFICE.

THOMAS W. WILLERTON, OF BLOOMINGDALE, MICHIGAN.

TIRE.

1,319,549.  Specification of Letters Patent.  Patented Oct. 21, 1919.

Application filed October 7, 1918. Serial No. 257,211.

*To all whom it may concern:*

Be it known that I, THOMAS WILLIAM WILLERTON, a subject of the King of Great Britain, residing at Bloomingdale, in the county of Van Buren and State of Michigan, have invented certain new and useful Improvements in Tires, of which the following is a specification.

My invention relates to new and useful improvements in a tire and has for its principal object the construction of the tire in such a manner that it will have sufficient resiliency to take up jars but at the same time will not be subjected to punctures or blow-outs.

Another object of the invention is the construction of the tire with a pneumatic inner tube to provide resiliency and a metal covering to protect the pneumatic tube from punctures and blow-outs.

A further object of the invention resides in a peculiarly constructed rim adapted to be secured to the wheel felly to support and hold the pneumatic tube in proper position.

A still further object resides in means for connecting the rim and metallic casing for limiting the movement with relation to one another.

With these and other objects in view my invention consists in the novel details of construction and arrangement of parts which will be more clearly understood from the following specification and drawings in which.

Figure 1:
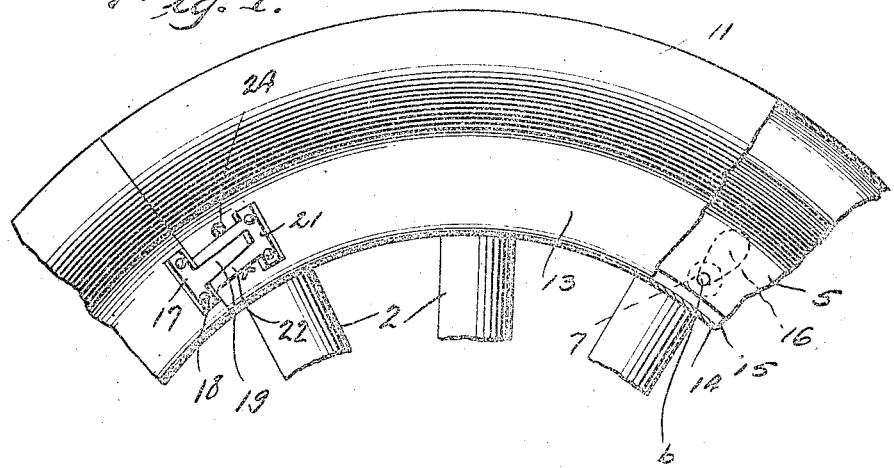
Figure 1 is a fragmental side view of the tire, partly in vertical section.

In the drawings the numeral 1 indicates a wheel felly of ordinary construction and 2 the spokes secured thereto in the ordinary manner. In carrying out my invention I provide a rim which is adapted to be secured to the felly 1 and this rim is indicated generally by the letter A. The rim comprises a base plate 3 the edges of which are curved upwardly to form the flanges 4 as more particularly illustrated in Fig. 2 of the drawings. The plate 3 is of greater width than the felly 1, for the purpose which will be presently described, and is provided on the under side with the transversely spaced depending arms 5 which are provided, adjacent their lower ends, with threaded openings adapted to receive the threaded end of a pin 6 having an enlarged head 7 on the outer end thereof.

It will be understood that the plate 3 extends circumferentially of the felly 1 and is secured to the felly by means of bolts 8 which pass through the plate 3 and felly 1 to receive a nut 9 on the threaded end thereof. The rim, noted generally by the letter A, is preferably formed in two sections whereby it may be easily assembled upon the felly but I do not desire to limit myself to merely making said rim in two sections as it might equally as well be made in a plurality of sections.

Figure 2:
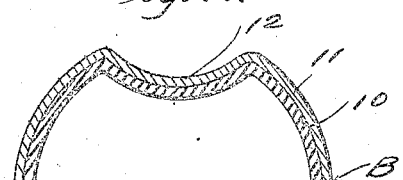
Fig. 2 is a transverse vertical section through the tire.

A rubber tube 10 is adapted to be received on the rim A, as more particularly illustrated in Fig. 2 of the drawings, and when said tube is inflated it will assume the position illustrated and engage the flanges 4 formed on the plate 3.

Figure 4:
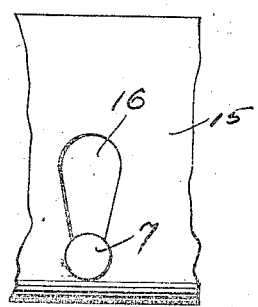

An outer casing is indicated generally by the letter B and is formed with a substantially circular portion 11 adapted to encircle the tube 10 as well as the flanges 4 of the rim. A central depression 12 is formed in the top of the casing, as more particularly illustrated in Fig. 2 of the drawings, and when the tube 10 is inflated the depression 12 will naturally be forced downwardly on the top of the tube so that the tube will conform to the curvature of the casing. The portion 11 is provided on each edge with a downwardly extending flange 13 which is curved at the lower end as indicated at 14 and then upwardly as indicated at 15 to form an arm extending parallel with the flange. The arms 15 are provided with a plurality of elongated openings 16 of the shape more particularly illustrated in Fig. 4 of the drawings and the pins 6 are adapted to pass through said openings and the enlarged head 7 will be on the outer surface on the outside of said arms 15.

Figure 3:
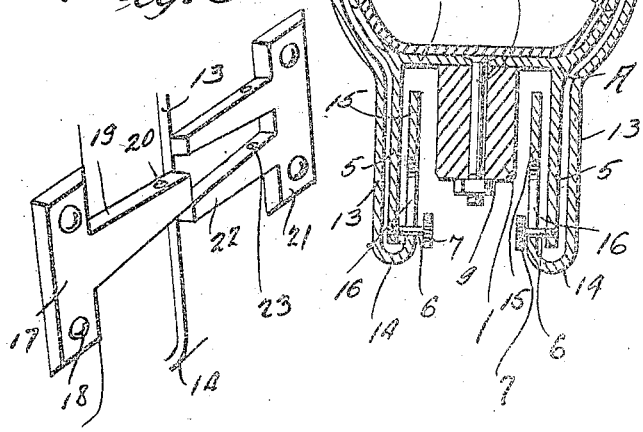
Fig. 3 is a perspective of the fastening means for the ends of the outer casing of the tire and, Fig. 4 is a fragmental side view of the inner arm of the outer casing of the tire showing the connecting means to the rim.

The casing is preferably constructed of two or more sections and in order to connect the ends of the sections I have provided the fastening means more particularly illustrated in Fig. 3 of the drawings. On one section I secure a plate 17 by means of rivets or bolts 18 and this plate is provided with a tongue 19 having an opening 20 therethrough. A plate 21 is secured to the end of the opposite section and this plate 21 is provided with the spaced extension 22 having an opening 23 therethrough. As illustrated the tongue 19 on the plate 17 extends beyond the end of the section whereas the extensions 22 on the plate 21 merely extend to the end of the section. When the ends of the sections are brought together the extension 19 will be received between the extensions 22 and a pin 24 is passed through the openings 23 and the opening 20 for securing the members together.

Having fully described the detailed construction of my tire it is thought that the advantages and mode of use will be clearly understood. When in assembled position the rim, tube, and casing, will all be in the positions illustrated more particularly in Fig. 2 of the drawings. When the tube 10 is inflated it will hold the casing B extended but when deflated the casing can be pressed downwardly so as to be disconnected from the rim. When the wheel passes over the road the casing will naturally be depressed thereby placing the tube 10 under pressure and when depressed the arms 15 will slide with relation to the flanges 5 and be properly guided by the pin 6 which passes through the elongated openings 16. By having the elongated openings 16 of the shape shown, whereby the upper end is larger than the lower end, the enlarged head 7 of pin 6 may be withdrawn through the opening when it is desired to remove the casing. It will be found that I have provided simple means connecting the rim to the felly as well as the casing to the rim. By having the plate 3 of greater width than the felly 1 there is sufficient space left to accommodate the movement of the arm 15. It will also be noted that the parts are so constructed as to exclude dust or moisture from the inner tube.

By providing the channel or depression 12 in the casing the skidding of the tire is prevented thus increasing the efficiency of the casing.

The foregoing description and the drawings have reference to what may be considered the preferred, or approved form of my invention. It is to be understood that I may make such changes in construction and arrangement and combination of parts, materials, dimensions, etc., as may prove expedient and fall within the scope of the appended claim.

Having fully described my invention what I claim as new and desire to secure by Letters Patent is:

A tire comprising a rim, an inflatable tube received on the rim, a sectional casing surrounding the tube, a plate secured to each end of the sections, a tapering tongue extending beyond one end of the sections, a pair of spaced tongues forming a substantial V-shaped slot for receiving the tapering tongues, secured to the end of the section adjacent the first mentioned section, said spaced tongues only extending to the end of the section, and means passing through the tongues to hold the sections together.

In testimony whereof I affix my signature in presence of two witnesses.

THOMAS W. WILLERTON.

Witnesses:
 BURNELL WEIRICK,
 JOE H. WEIRICK.